(12) United States Patent
Irizarry-Lugo (10) Patent No.: US 8,104,108 B2
(45) Date of Patent: Jan. 31, 2012

(54) WATERLESS TOILET

(76) Inventor: Franklin Irizarry-Lugo, Guayanilla (PR)

( * ) Notice: Subject to any disclaimer, the term of this patent is extended or adjusted under 35 U.S.C. 154(b) by 943 days.

(21) Appl. No.: 10/597,929

(22) PCT Filed: Feb. 11, 2005

(86) PCT No.: PCT/US2005/004809
§ 371 (c)(1),
(2), (4) Date: May 2, 2008

(87) PCT Pub. No.: WO2005/079408
PCT Pub. Date: Sep. 1, 2005

(65) Prior Publication Data
US 2008/0222785 A1 Sep. 18, 2008

Related U.S. Application Data (60) Provisional application No. 60/544,412, filed on Feb. 12, 2004.

(51) Int. Cl.
*A47K 11/04* (2006.01)
*E03D 9/10* (2006.01)
*E03D 1/00* (2006.01)

(52) U.S. Cl. ............. 4/483; 4/479; 4/484; 4/319; 4/320; 4/321; 4/322

(58) Field of Classification Search ............. 4/479–484, 4/464, 465, 469, 470, 234, 238, 319–322
See application file for complete search history.

(56) References Cited

U.S. PATENT DOCUMENTS

| | | | | |
|---|---|---|---|---|
| 2,801,426 A | * | 8/1957 | La Gorce et al. | 4/484 |
| 3,817,858 A | * | 6/1974 | Yost | 210/629 |
| 4,720,880 A | * | 1/1988 | Barreau | 4/661 |
| 4,807,308 A | * | 2/1989 | Person et al. | 4/483 |
| 5,901,385 A | * | 5/1999 | Nian | 4/484 |

\* cited by examiner

*Primary Examiner* — Gregory Huson
*Assistant Examiner* — Erin Deery
(74) *Attorney, Agent, or Firm* — Nils H. Ljungman & Associates (57) ABSTRACT

A toilet that does not require water for use, which may be used in the home or which may be portable for use at locations outside the home, having a disposable, biodegradable bag for catching and storing human waste for disposal, and a method for disposing of said biodegradable bag.

1 Claim, 6 Drawing Sheets

WATERLESS TOILET

This application is a National Stage Entry of International Patent Application No. PCT/US2005/004809, filed on Feb. 11, 2005, which claims priority from U.S. Provisional Application No. 60/544,412, filed on Feb. 12, 2004. International Patent Application No. PCT/US2005/004809 was pending as of the filing date of this application. The United States was an elected state in International Patent Application No. PCT/US2005/004809.

BACKGROUND OF THE INVENTION

1. Technical Field

This application relates to a toilet that does not require water for use, which may be used in the home or which may be portable, such as for use in camping. This application further relates to a toilet that uses a bag made of a biodegradable material to catch human waste, which bag may be disposed of after a single use, and a method for disposing of said biodegradable bags.

2. Background Art

Water conservation has become a major environmental issue in the past few decades. Everyday, humans use millions of gallons of water, a good deal of which is flushed down toilets. Human beings are therefore needlessly wasting one of our planet's most precious resources. Water is necessary to sustain all life on the planet, yet we use so much of it to dispose of our own waste.

Further, many countries in this world do not have access to running water. People in these countries are forced to dispose of their waste in the same areas that they must also live. Most of the world's rural population has no piped water supply and must rely upon pit latrines for sewage disposal. Pit latrines are holes in the ground which are sited, usually at some distance, away from a residence. When a latrine's capacity has been reached, it is abandoned and a new pit is dug at another site. Latrines provide no sewage treatment and rely upon soakage into the earth for the dispersal of liquids. As the population generally relies on shallow wells or surface water for drinking purposes, there is the ever-present risk of disease spreading from contaminated water throughout the community.

In addition to the above, there are some instances where running water simply isn't available. For instance, water is typically not available at a campground or a portable toilet, which are set up at various locations, such as at construction sites or public parks. It would therefore be advantageous for all of the above situations to have a toilet that does not require the use of running water, and which is easily and conveniently maintained and is also friendly to the environment.

U.S. Pat. No. 5,058,218, entitled "Waterless toilet," teaches a waterless toilet that ensures operation with no need for the user to seal a used container, remove it, and insert a new one. The invention is intended to operate automatically by means of appropriate drive mechanisms and components and to provide each user with a ready-to-use and hygienic toilet. It is therefore not meant to be portable.

U.S. Pat. No. 5,887,290, entitled "Waterless toilet system," teaches a waterless toilet that uses a motor-driven crushing and separating machine designed to cut bags and waste matter into pieces, and separate solid matter from water.

U.S. Pat. No. 5,177,819, entitled "Waterless toilet with containers with lids for waste" also teaches a waterless toilet, but offers no methods of disposal of used waste bags.

U.S. Pat. No. 4,285,719, entitled "Organic material recycling method and device" teaches a method and device for disposing of human waste or other types of refuse. Once disposed of into a tank, the waste is then broken down by several means, including the use of bacteria and worms.

OBJECT OR OBJECTS

One possible object is to provide a toilet that does not require running water for use. The toilet instead uses bags made of a biodegradable material to catch human waste for easy disposal.

A further possible object is to provide a means and method for disposing biodegradable bags subsequent to use.

DISCLOSURE OF THE INVENTION

The objects can be achieved in a waterless toilet that uses a biodegradable bag for catching and disposing of human waste, and a means and method for disposing of said biodegradable bags, according to at least one possible embodiment.

An embodiment of the body of the toilet may be similar to most household toilets. According to at least one embodiment, the body of the toilet may comprise a toilet body, a toilet bowl, a base, a lid that may be configured to be opened and closed, a seat that may be configured to be hinged so that the seat may be lifted up and away from the body of the toilet, and a hole or opening on each of the right and left sides of the body of the toilet. The top portion of the toilet bowl may comprise a rounded lip, which rounded lip may run around the perimeter of the top of the body of the toilet, and may be designed to hold the biodegradable bag in place. An embodiment of the seat of the toilet may comprise a rounded indentation that runs along the perimeter of the bottom or underside of the seat, which rounded indentation may be configured to receive the rounded lip on the top of the body of the toilet. The holes or openings may be located several inches from the top of the body of the toilet. The base of the toilet may be designed to be bolted into the floor, or it may be designed to be portable. Since the toilet does not require water, there could be no tank behind the body of the toilet. Further, since the toilet does not require water, the toilet body could be positioned virtually anywhere, since it does not need to be connected to water pipes. Instead of using water to dispose of human waste, the toilet uses a bag made of a biodegradable plastic material, or any other type of biodegradable material, to catch the excrement and store it for disposal.

An embodiment of the biodegradable bag may be designed with an angled side, which angled side could be positioned to face the rear of the body of the toilet. The angled side may be designed to catch fecal matter to protect the user from unsanitary splashing. The biodegradable bag may further comprise a string on each of the right and left sides of the bag, which strings may be designed to be pulled outward away from the bag in order to close the bag in a draw-string fashion. Further, the biodegradable bag could comprise a ring, which ring could preferably be located on the top of the bag and may be positioned facing the front of the body of the toilet. The ring may be designed to be used as a handle to pull the biodegradable bag from the body of the toilet when it is ready to be disposed of.

The biodegradable bag could be held in place in the body of the toilet by the rounded lip. The strings on the left and right sides of the biodegradable bag could be fed through the holes or openings on the left and right side of the body of the toilet. Once the user is finished using the toilet, he or she could pull the strings on the left and right sides of the bag while still seated, effectively sealing the bag in a drawstring fashion and eliminating visual exposure to the contents of the bag. Once the bag is closed, the user may stand up and retrieve the bag from the body of the toilet by grabbing the ring. The biodegradable bag may then be disposed of, and a new bag may be installed into the body of the toilet.

According to at least one possible embodiment, a means and method for disposal of the biodegradable bags may be installed in the home of a user. A possible embodiment of a disposal system could be comprised of a disposal chute that leads to the outside of the house and may be installed in the wall of the bathroom. In one possible embodiment, the disposal chute could be coated with a non-stick material to prevent the coating of waste on the walls of the disposal chute. The disposal chute could lead to a tank system for waste disposal, which tank system would preferably be located outside of the house and underground. The bottom end of the disposal chute could comprise a spring-biased door. The spring-biased door may be designed to open when waste is passing through it, then to close immediately thereafter. The spring-biased door may be designed to keep odors from escaping the decomposing tank and drifting back up into the home.

After passing though the spring-biased door, the biodegradable bags could then sit in a decomposing chamber. While inside the decomposing chamber, the waste may begin to decompose and break down on its own. In another possible embodiment, a bacterial agent or other decomposing agent may be added to the decomposing chamber to help break down the biodegradable bag and the waste contained therein. As the solid waste begins to break down, it may settle to the bottom of the decomposing chamber, forming a sludge layer. The liquid waste may rise to the top of the decomposing chamber, forming a scum layer, which scum layer is mostly free of solid waste. The scum layer may begin to overflow out of the decomposing chamber and into a finishing tank or finishing area. While sitting in the finishing tank, the waste could be further treated with bacterial agents or other decomposition agents, and could be broken down further for disposal. Once the materials have been broken down in the finishing tank, a suction pipe could carry the decomposed waste to the street, where the waste could be collected by a waste disposal company. The sludge layer is never fully reduced or broken down, and must be removed from the decomposing chamber upon the decomposing chamber being substantially full of sludge.

In an alternate embodiment, the waste may be conducted from the finishing tank to a septic tank, rather than being carried through a suction pipe to the street. In yet another alternate embodiment, the biodegradable bag may be disposed of in a trash can or a diaper pail.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BEST MODE FOR CARRYING OUT THE INVENTION

Figure 1:
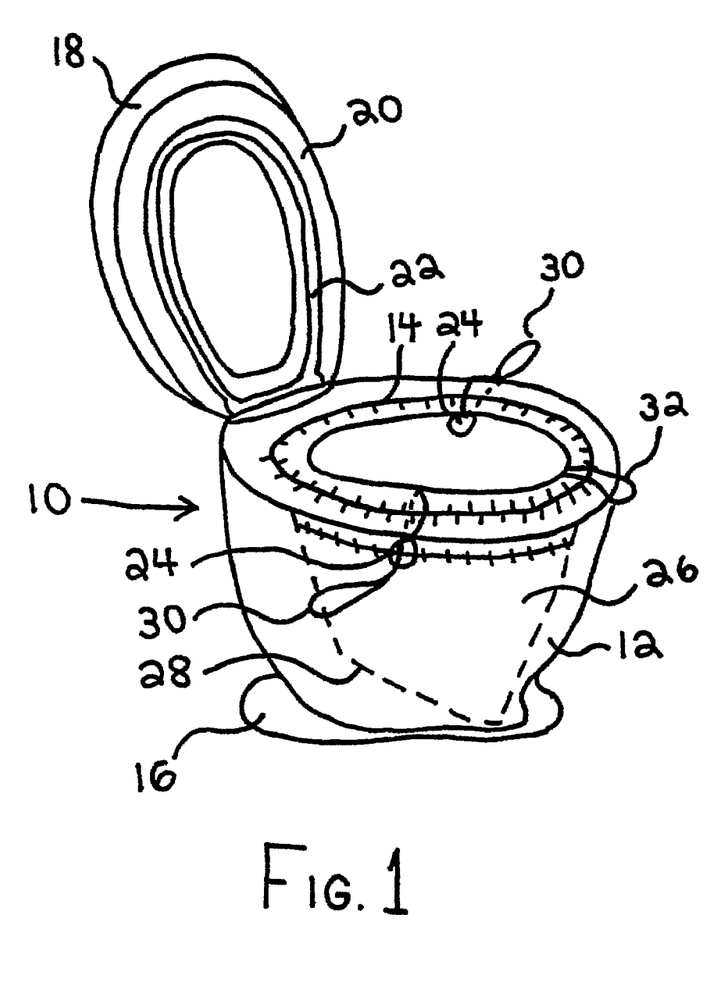
FIG. 1 shows a perspective view of a toilet with a biodegradable bag installed therein, according to at least one possible embodiment.

FIG. 1 shows a perspective view of a toilet with a biodegradable bag installed therein, according to at least one possible embodiment. An embodiment of the biodegradable bag 26 is preferably constructed with a biodegradable plastic material, but may also be constructed with any number of biodegradable materials. The biodegradable bag 26 is designed with an angled side 28, which angled side 28 would preferably be positioned to face the rear of the body of the toilet 10. The angled side 28 is designed to catch fecal matter to protect the user from unsanitary splashing. The biodegradable bag 26 further comprises a string 30 on each of the right and left sides of the bag 26, which strings 30 are designed to be pulled outward away from the bag 26 in order to close the bag 26 in a draw-string fashion. Further, the biodegradable bag 26 comprises a ring 32, which ring 32 is preferably located on the top of the bag 26 and is preferably positioned facing the front of the body of the toilet 10. The ring 32 is preferably designed to be used as a handle to pull the biodegradable bag 26 from the body of the toilet 10 when it is ready to be disposed of.

The biodegradable bag 26 is held in place by a rounded lip 14 that runs around the perimeter of the top of the body of the toilet 10. An embodiment of the seat 20 of the toilet preferably comprises a rounded indentation 22 that runs along the perimeter of the bottom or underside of the seat 20, which rounded indentation 22 is configured to receive the rounded lip 14 on the top of the body of the toilet 10. An embodiment of the toilet 10 comprises a toilet bowl 12, a base 16, a lid 18 that is configured to be opened and closed, a seat 20 that is configured to be hinged so that the seat 20 may be lifted up and away from the body of the toilet 10, and a hole or opening 24 on each of the right and left sides of the body of the toilet 10. The holes or openings 24 are preferably located several inches, such as 3 inches, from the top of the body of the toilet 10. The base of the toilet 16 may be designed to be bolted into the floor, or it may be designed to be portable.

Figure 2:
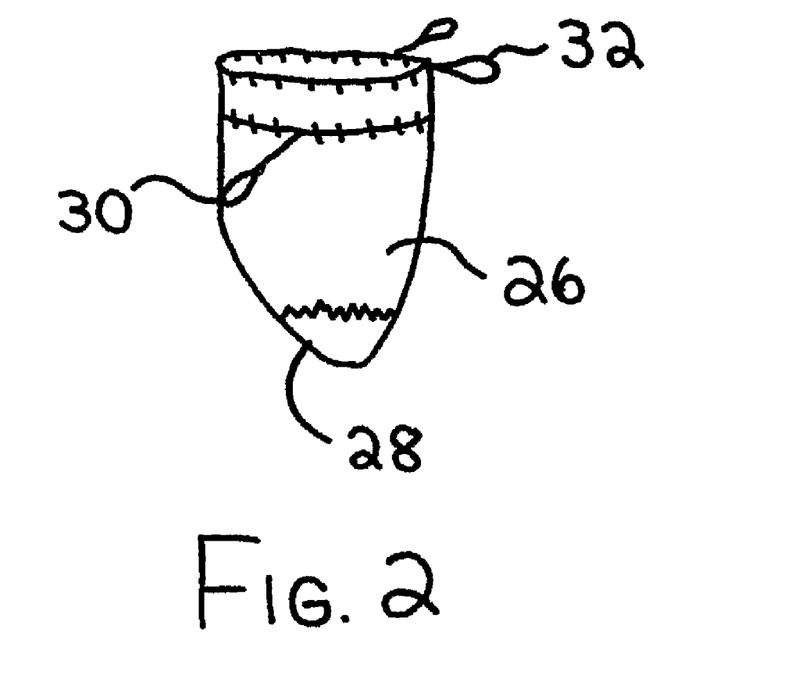
FIG. 2 shows an open biodegradable bag according to at least one possible embodiment.
Figure 3:
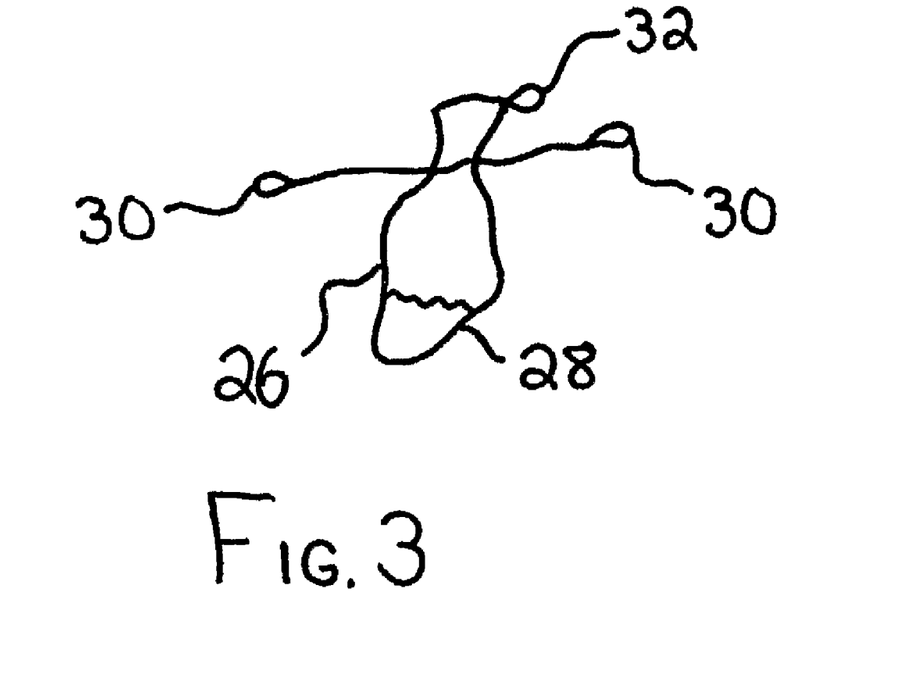
FIG. 3 shows a closed biodegradable bag according to at least one possible embodiment.

FIG. 2 shows an embodiment of the biodegradable bag 26, as shown and described in FIG. 1, in its opened and ready-to-use position. The biodegradable bag 26 is designed to be held in place in the body of the toilet 10 by the rounded lip 14. The strings 30 on the left and right sides of the biodegradable bag 26 are to be fed through the holes or openings 24 on the left and right side of the body of the toilet 10. Once the user is finished using the toilet, he or she would pull the strings 30 on the left and right sides of the bag 26 while still seated, effectively sealing the bag 26 in a drawstring fashion and preventing visual exposure to the contents of the bag 26. Once the bag 26 is closed, the user may stand up and retrieve the bag 26 from the body of the toilet 10 by grabbing the ring 32. The biodegradable bag 26 may then be disposed of, and a new bag 26 may be installed into the body of the toilet 10. FIG. 3 shows the biodegradable bag 26, as shown and described in FIGS. 1 and 2, in its closed position and ready for disposal.

Figure 4:
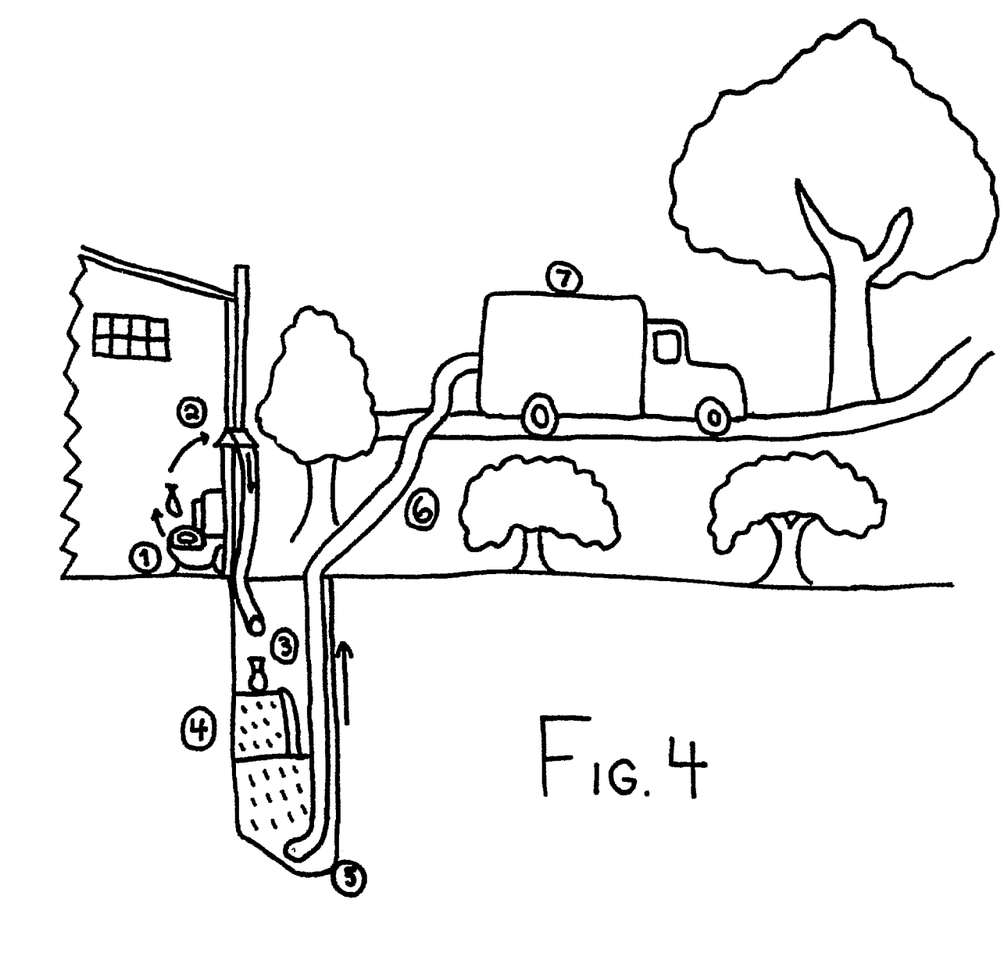
FIG. 4 shows a system and method of disposal of waste, according to at least one possible embodiment.
Figure 5:
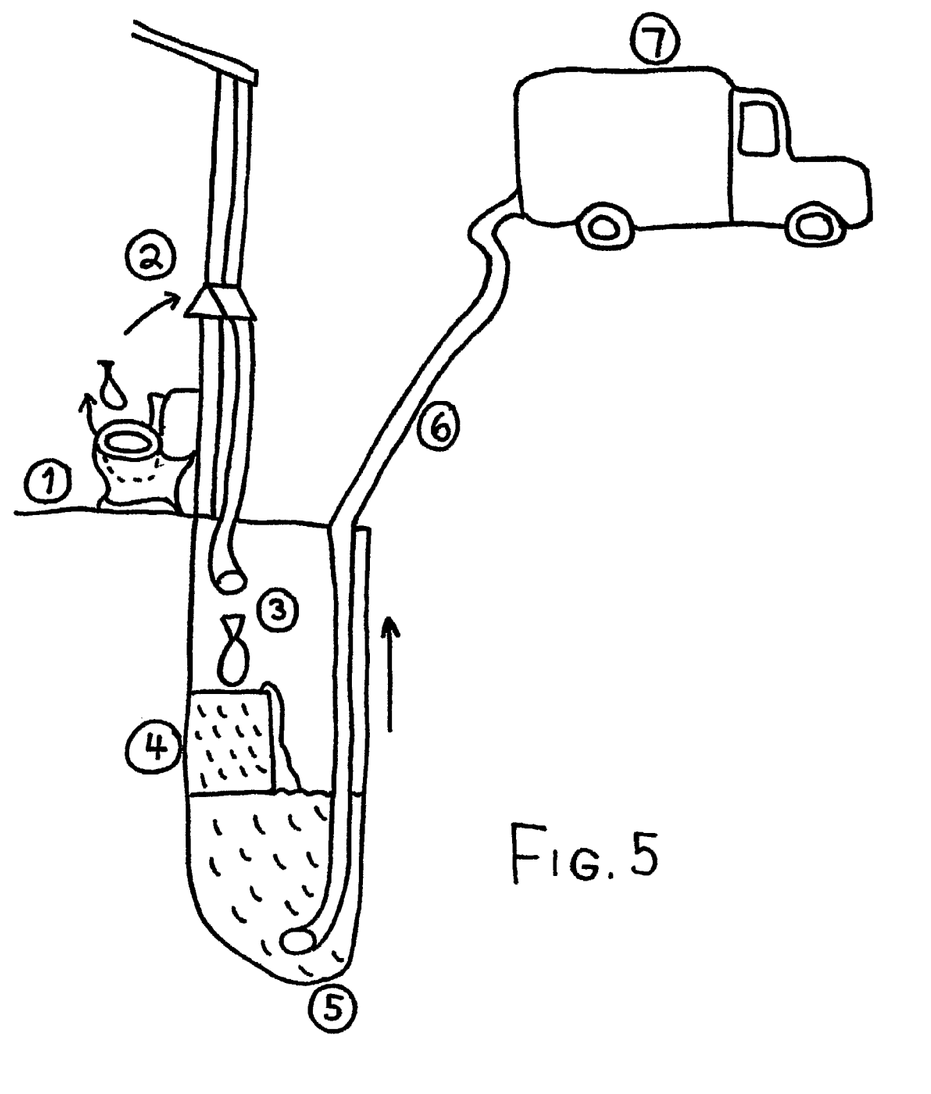
FIG. 5 shows a blown up version of the waste disposal system shown in FIG. 4.

FIG. 4 shows a possible embodiment of a disposal system and method for disposal of human waste contained in the biodegradable bags 26. In this embodiment, the toilet 10 is installed in a home. In this embodiment, once a user has used and sealed the biodegradable bag 26, the user would dispose of the bag in a disposal chute 2 that is installed in the wall of the bathroom and leads to the outside of the house. The disposal chute 2 is open or can be equipped with a spring-biased door 9 (see FIGS. 6 and 7) at the lower end of the chute. The spring-biased door 9 is designed to be pushed open by waste thrown down the disposal chute 2, and to close once waste has passed out of the disposal chute 2. In another possible embodiment, the entrance to the chute could be spring-loaded to close the chute. In this manner, either end or both ends could be closed or sealed. The disposal chute 2 leads to a tank system 3 for waste disposal, which tank system 3 for waste disposal would preferably be located outside of the house and underground. The biodegradable bags 26 would then sit in a decomposing tank 4 to be exposed to chemicals to break down the biodegradable bag 26 and the waste contained therein. Once the materials have been broken down in the decomposing tank 4, the waste would be moved to a final finishing tank 5 for further treatment. A suction pipe 6 would then carry the decomposed waste to the street, where the waste could be collected by a waste disposal company 7. FIG. 5 shows a blown up version of the disposal method shown in FIG. 4.

Figure 6:
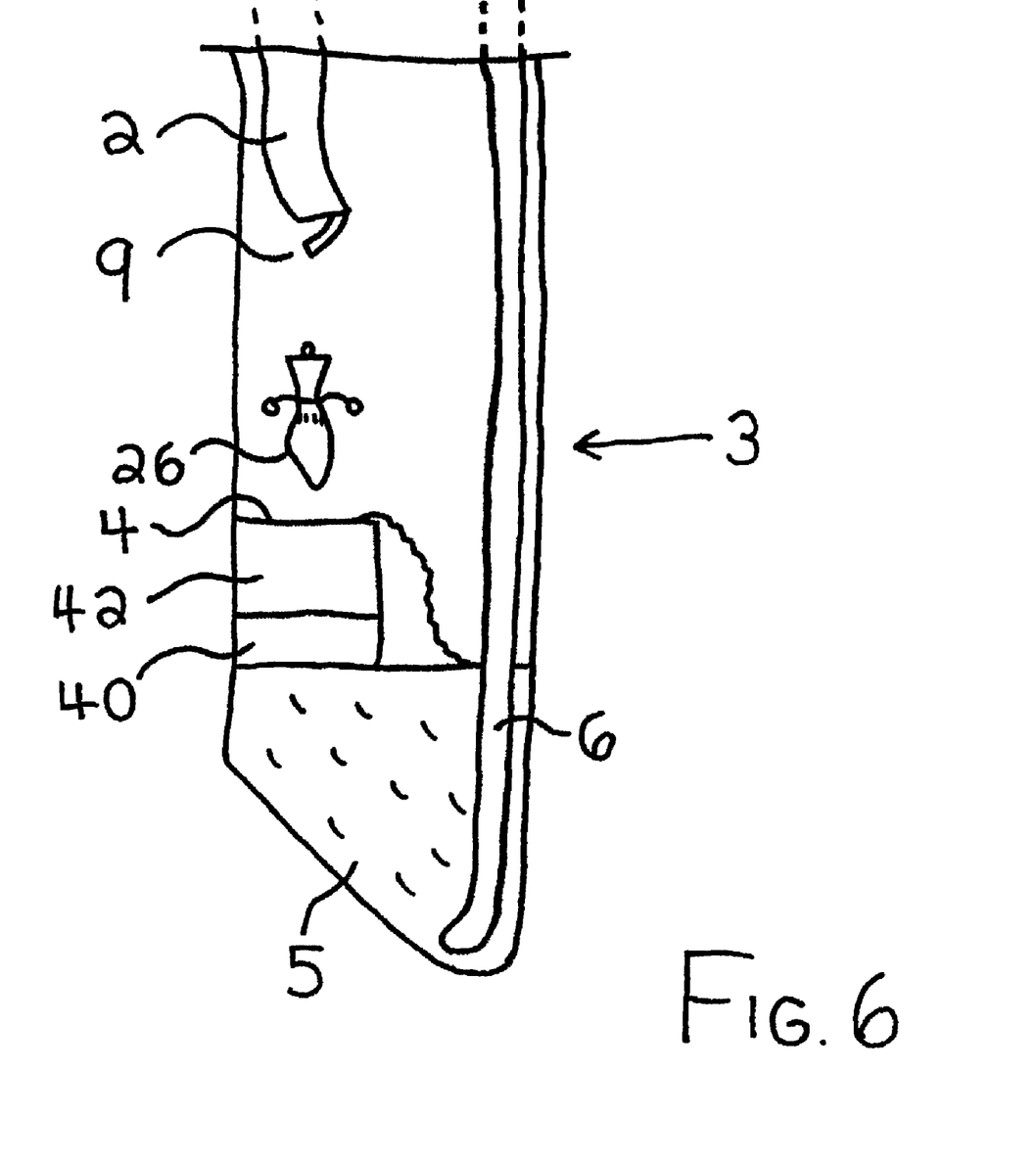
FIG. 6 shows a blown up version of the underground portion of the waste disposal system shown in FIGS. 4 and 5.
Figure 7:
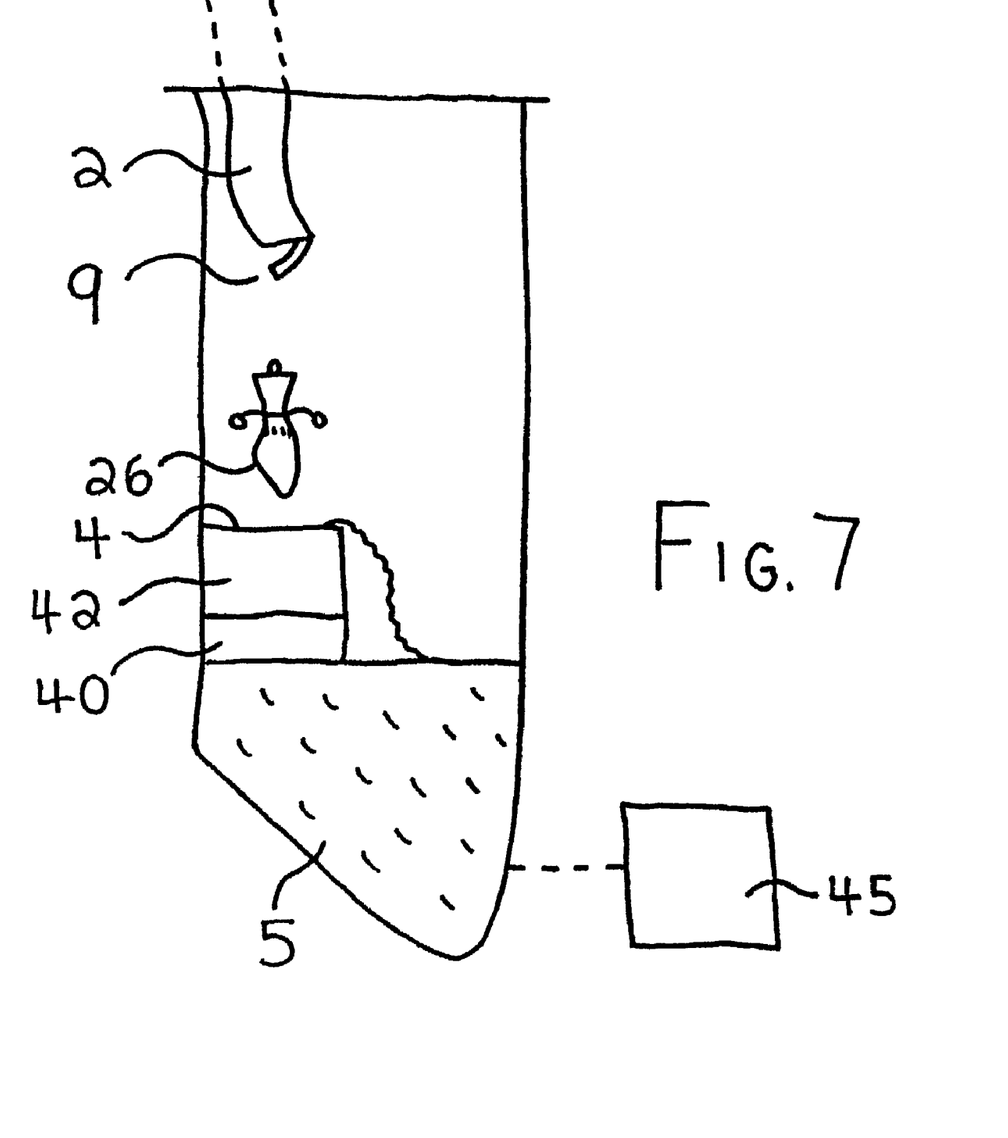
FIG. 7 shows an alternate embodiment of the waste disposal system shown in FIG. 6, wherein the waste is conducted to a septic tank.

FIG. 6 shows a blown up version of the tank system for waste disposal 3. The spring-biased door 9 is seen in its substantially open position. The sludge layer 40 can be seen resting at the bottom of the decomposing tank 4, and the scum layer 42 can be seen overflowing into the finishing tank 5 for further treatment and decomposition. The suction pipe 6, which would carry the decomposed waste to a the street to be collected by a waste disposal truck 7, is also shown. FIG. 7 shows an alternate embodiment, wherein the waste in the finishing tank 5 would be conducted to a septic tank 45.

One feature or aspect of an embodiment is believed at the time of the filing of this patent application to possibly reside broadly in a waterless toilet having a disposable, biodegradable bag for catching and storing human waste for disposal, said waterless toilet comprising: a toilet bowl; said toilet bowl comprising a rounded lip which runs along the perimeter of the top of the toilet bowl; a base; a lid that is configured to be opened and closed; a seat that is configured to be hinged so that the seat may be lifted up and away from the body of the toilet; and said seat comprising a rounded indentation that runs along the perimeter of the bottom or underside of the seat, which rounded indentation is configured to receive the rounded lip on the top of the toilet bowl; a hole or opening on each of the right and left sides of the body of the toilet; a biodegradable bag for catching and storing waste for disposal; said biodegradable bag being designed with a substantially steep angle at the back of the bag, which angle slopes downward toward the front of the bag; said biodegradable bag comprising a string on each of the left and right sides of the bag, which strings run through the neck of the bag in a drawstring fashion.

Another feature or aspect of an embodiment is believed at the time of the filing of this patent application to possibly reside broadly in a method of disposal for disposing of said biodegradable bags, said method of disposal comprising: a disposal chute that is installed in the wall of the bathroom, and which leads to the outside of the house; said disposal chute leading to an underground tank system for waste disposal; said tank system for waste disposal comprising: a decomposing tank; a finishing tank; and a suction pipe for taking waste from the finishing tank to the street level to be collected by a waste disposal truck.

Please note that any measurements or dimensions included herein and in the accompanying figures are simply included as examples of possible designs and/or configurations of at least one possible embodiment. These measurements or dimensions should not be construed as limiting the claims to only these measurements or dimensions described in the application. It should further be understood that additional possible embodiments having different measurements and dimensions not explicitly described herein may be possible within the scope of the possible embodiments described herein.

Some examples of treatment for waste which may possibly be utilized or adapted for use in at least one possible embodiment may possibly be found in the following U.S. patents: U.S. Pat. No. 5,746,919, entitled "Temperature-phased anaerobic waste treatment process;" U.S. Pat. No. 5,525,288, entitled "Temperature-phased anaerobic waste treatment process;" U.S. Pat. No. 4,664,803, entitled "Anaerobic treatment of wastewater;" U.S. Pat. No. 4,415,453, entitled "Anaerobic treatment;" U.S. Pat. No. 4,372,856, entitled "Process and system for anaerobic treatment of waste;" U.S. Pat. No. 4,366,059, entitled "Anaerobic treatment;" and U.S. Pat. No. 4,315,823, entitled "Anaerobic treatment."

The details in the patents, patent applications and publications may be considered to be incorporable, at applicant's option, into the claims during prosecution as further limitations in the claims to patentably distinguish any amended claims from any applied prior art.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Some examples of septic tanks or septic tank systems which may possibly be used or adapted for use in at least one possible embodiment may possibly be found in the following U.S. patents: U.S. Pat. No. 6,649,060, entitled "Septic tank having a support system and mold for manufacturing same;" U.S. Pat. No. 6,558,535, entitled "Residential septic tank with seams above sewage line and residential septic tank with stepped ribs;" U.S. Pat. No. 6,551,508, entitled, "Septic tank waste water filter including a reservoir for filtered waste water;" U.S. Pat. No. 6,495,040, entitled "Septic tank filtering system;" U.S. Pat. No. 6,482,319, entitled "In-line filtration system for treatment of septic tank effluent;" U.S. Pat. No. 6,440,304, entitled "In-line filtration system for treatment of septic tank effluent;" U.S. Pat. No. 6,331,247, entitled "Septic tank filtering system;" U.S. Pat. No. 6,319,873, entitled "Biological activator for a septic tank;" U.S. Pat. No. 6,306,304, entitled "Aerobic treatment of septic tank effluent;" U.S. Pat. No. 6,280,614, entitled "Residential septic tank;" U.S. Pat. No. 6,231,764, entitled "Septic tank pump arrangement including a self-cleaning rotary strainer;" U.S. Pat. No. 6,136, 190, entitled "Septic tank filtering system;" and No. 4,882,046, entitled "Multi-chamber septic tank assembly."

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

The components disclosed in the various publications, disclosed or incorporated by reference herein, may be used in the embodiments of the present invention, as well as equivalents thereof.

Some examples of biodegradable plastic which may be used or adapted for use in at least one possible embodiment may possibly be found in the following U.S. patents: U.S. Pat. No. 6,569,990, entitled "Plastic articles comprising biodegradable PHA copolymers;" U.S. Pat. No. 6,437,022, entitled "Composition for molding biodegradable plastic, biodegradable plastic obtained therefrom, method of molding the same, and use of biodegradable plastic;" U.S. Pat. No. 6,107,378, entitled "Biodegradable plastic composition;" U.S. Pat. No. 6,083,621, entitled "Biodegradable plastic product made from coconut husk fiber powder mixture;" U.S. Pat. No. 5,961,906, entitled "Biodegradable and compostable plastic articles, including flat-shaped articles;" U.S. Pat. No. 5,948,848, entitled "Biodegradable plastic material and a method for its manufacture;" U.S. Pat. No. 5,861,461, entitled "Biodegradable plastic composition, method for preparing thereof and product prepared therefrom;" U.S. Pat. No. 5,736,586, entitled "Biodegradable foamed plastic materials;" U.S. Pat. No. 5,618,855, entitled "Biodegradable copolymers and plastic articles comprising biodegradable copolymers;" U.S. Pat. No. 5,505,830, entitled "Biodegradable compostable plastic and method of making the same;" U.S. Pat. No. 5,401,778, entitled "Biodegradable plastic composition and biodegradable plastic shaped body;" U.S. Pat. No. 5,378,738, entitled "Biodegradable plastic;" U.S. Pat. No. 5,376,708, entitled "Biodegradable plastic materials, method of producing them, and their use;" U.S. Pat. No. 5,346,929, entitled "Biodegradable plastic and articles made therefrom;" U.S. Pat. No. 5,227,415, entitled "Biodegradable plastic composition;" and No. 5,124,371, entitled "Biodegradable plastic composition, biodegradable plastic shaped body and method of producing same."

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements ma de relating to the object or objects are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

Some examples of toilet bowls that may possibly be utilized or adapted for use in at least one possible embodiment may possibly be found in the following U.S. patents: No. D483,447, entitled "Toilet bowl;" No. D480,456, entitled "Toilet bowl;" No. D439,639, entitled "Toilet bowl;" No. D422,064, entitled "Toilet bowl;" No. D360,936, entitled "Toilet bowl;" No. D359,548, entitled "Toilet bowl;" No. D355,711, entitled "Toilet bowl;" No. D355,709, entitled "Toilet bowl;" and No. D351,222, entitled "Toilet bowl."

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

Some examples of chutes used for disposal which may possibly be utilized or adapted for use in at least one possible embodiment may possibly be found in the following U.S. patents: U.S. Pat. No. 5,255,769, entitled "Discharge chute for trash receptacles;" U.S. Pat. No. 5,568,871, entitled "Door and chute for separated waste control;" No. 5,253,766, entitled "Waste disposal chute;" No. D328,174, entitled "Waste disposal chute or similar article;" U.S. Pat. No. 5,004,377, entitled "Isolated insertion chute for suction-operated garbage disposal systems;" and No. D296,834, entitled "Trash chute."

All of the patents, patent applications and publications recited herein, and in the Declaration attached hereto, are hereby incorporated by reference as if set forth in their entirety herein.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

Some examples of suction systems which may possibly be utilized or adapted for use in at least one possible embodiment may be found the following U.S. patents: U.S. Pat. No. 6,557,511, entitled "Suction system;" U.S. Pat. No. 6,192,850, entitled "Suction system;" No. 6,158,926, entitled "Suction system for urban wastes and for recycling materials;" U.S. Pat. No. 6,097,778, entitled "Gravity driven suction pump system, methods, and apparatus;" U.S. Pat. No. 5,935,439, entitled "Suction system with end supported internal core tube suction strainers;" and U.S. Pat. No. 5,261,897, entitled "Portable suction system."

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

Some examples of non-stick or repellent coatings which may possibly be utilized or adapted for use in at least one possible embodiment may possibly be found in the following U.S. patents: U.S. Pat. No. 6,641,870, entitled "Ink, paint, pollutant, bioorganism, oil, water, and/or dirt repellent coating;" U.S. Pat. No. 6,579,620, entitled "Water-repellent coating and coating film;" U.S. Pat. No. 5,824,421, entitled "Oil- and water-repellent coating composition;" U.S. Pat. No. 5,616,388, entitled "Water repellent coating;" U.S. Pat. No. 5,134,203, entitled "Crosslinkable compositions and their use in the production of coatings which repel sticky substances;" U.S. Pat. No. 4,617,057, entitled "Oil and water repellent coating compositions;" U.S. Pat. No. 4,600,735, entitled "Soil-repellent coating composition;" and U.S. Pat. No. 3,940,359, entitled "Soil-repellent coating compositions."

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, the abstract is not intended to limit the claims in any manner and should not be interpreted as limiting the claims in any manner.

The embodiments as described herein above in the context of the embodiments are not to be taken as being limited to all of the provided details thereof, since modifications and variations thereof may be made without departing from the spirit and scope of the embodiments.

What is claimed is:

1. A waterless toilet having a disposable, biodegradable bag for catching and storing human waste for disposal, said waterless toilet comprising:
   a toilet bowl;
   said toilet bowl comprising a rounded lip which runs along the perimeter of the top of the toilet bowl;
   a base;
   a lid that is configured to be opened and closed;
   a seat that is configured to be hinged so that the seat may be lifted up and away from the body of the toilet; and
   said seat comprising a rounded indentation that runs along the perimeter of the bottom or underside of the seat, which rounded indentation is configured to receive the rounded lip on the top of the toilet bowl;
   a hole or opening on each of the right and left sides of the body of the toilet;
   a biodegradable bag for catching and storing waste for disposal;
   said biodegradable bag being designed with a substantially steep angle at the back of the bag, which angle slopes downward toward the front of the bag;
   said biodegradable bag comprising a string on each of the left and right sides of the bag, which strings run through the neck of the bag in a drawstring fashion.

* * * * *